Patented Jan. 10, 1933

1,893,869

UNITED STATES PATENT OFFICE

HAROLD A. MORTON, OF AKRON, OHIO

VULCANIZABLE COMPOUND AND PROCESS FOR PREPARING SAME

No Drawing.  Application filed January 7, 1931.  Serial No. 507,298.

My invention relates to the vulcanization of rubber and like compounds, and more particularly to the use of ingredients for promoting the action of organic accelerators.

The object of the invention is to provide a class of materials which may be manufactured at relatively low cost and which, when incorporated into an accelerated rubber stock, tend to additionally promote the curing characteristics of the accelerator and to provide a rubber stock, or compound, including an organic accelerator and an activator of the character to be hereinafter described.

It has been known to the prior art that certain acids and acidic materials, including certain salts which react in an acidic manner, function as activators of organic accelerators.

I have discovered that a rubber stock, as a pure gum stock, having incorporated therein an organic accelerator and an alkaline material, such as an alkaline metal salt of certain organic acids, when subjected to proper vulcanization conditions, will be cured more rapidly than a like compound having as the activator the previously used acids, or salts.

The materials which function as an activator in this invention are the alkaline metal salts of aliphatic monobasic acids having more than two carbon atoms in the chain.

Such activators all possess an alkaline reaction in solution and are extremely powerful promoters of vulcanization in the presence of organic accelerators of vulcanization.

The preferred method of carrying out the invention is to employ the sodium salts of the aforesaid acids in conjunction with aldehyde amine accelerators, although the process is not restricted to this class of accelerators.

Where the term "sodium salt" is used in this specification and appended claims, it is intended to include as an equivalent, "potassium salt," or like alkaline metals.

Among the activators contemplated by me may be mentioned the following:

Sodium crotonate_____ $C_3H_5COONa$
Potassium butyrate_____ $C_3H_7COOK$
Sodium butyrate_____ $C_3H_7COONa$
Sodium alpha ethyl beta propyl acrylate_____ $C_7H_{13}COONa$
Potassium oleate_____ $C_{17}H_{33}COOK$
Sodium oleate_____ $C_{17}H_{33}COONa$
Sodium ethyl hexoate_____ $C_7H_{15}COONa$
Potassium hexoate_____ $C_5H_{11}COOK$
Sodium laurate_____ $C_{11}H_{23}COONa$
Potassium heptoate_____ $C_6H_{13}COOK$
Potassium laurate_____ $C_{11}H_{23}COOK$
Sodium stearate_____ $C_{17}H_{35}COONa$
Sodium palmitate_____ $C_{15}H_{31}COONa$
Potassium stearate_____ $C_{17}H_{35}COOK$
Potassium crotonate_____ $C_3H_5COOK$
Potassium alpha ethyl beta propyl acrylate_____ $C_7H_{13}COOK$
Potassium ethyl hexoate_____ $C_7H_{15}COOK$
Sodium hexoate_____ $C_5H_{11}COONa$
Sodium heptoate_____ $C_6H_{13}COONa$
Potassium palmitate_____ $C_{15}H_{31}COONa$ The above materials serve to indicate the scope of the invention but the invention is not limited by the specific examples as many other sodium salts of this class function in like manner.

It is preferable to employ the above materials in conjunction with alpha ethyl beta propyl acryl aniline although many other accelerators function very advantageously when used with the above salts. Among other accelerators which may be used in this process may be mentioned the following: Ethylidene aniline, tetra methyl thiuram disulphide plus ethylidene aniline, ethylidene toluidine, butylidene aniline, crotylidene aniline, alpha ethyl beta propyl acryl toluidine, alpha ethyl beta methyl acryl aniline, heptylidene aniline, butylidene ethylene diamine, butylidene di methyl para phenylene diamine, butylidene toluidine, heptylidene ethylene diamine, mercaptobenzothiazole, mercaptobenzothiazole plus butylidene aniline, mercaptobenzothiazole plus alpha ethyl B propyl acryl aniline, tetramethyl thiuram mono sulphide plus butylidene aniline.

The above accelerators which function advantageously with the "activators" are indicative of the scope of the invention; many others function in like manner.

In carrying out the invention the "activator" may be added to the rubber stock separately or it may be admixed with the accelerator before addition.

One of the preferred methods of utilizing the invention is to precipitate the desired sodium salt in the presence of the accelerator, prior to incorporation into the rubber stock. This results in excellent dispersion of the salt and accelerator. The following example serves to indicate the manner by which this may be accomplished.

Alpha ethyl beta propyl acryl aniline (70 parts) is mixed well with lauric acid (30 parts) and caustic soda (5 parts) in aqueous solution, is slowly added with stirring. This results in a well mixed soft solid which may be used direct, or if desired, may be dried by any appropriate means.

If desired, the sodium salt may be prepared separately and then added to and mixed well with the accelerator. Or, the sodium salt and the accelerator may be milled separately into the rubber compound.

The following examples serve to indicate an appropriate vulcanizing temperature and time for properly vulcanizing a one-eighth inch slab made from the compounds within the purview of my invention. In the following tables "Ten. str." represents tensile-strength at break in pounds per square inch and "Elong." represents elongation. Cure represents time in minutes at the indicated steam pressure.

Example I

This example serves to demonstrate the use of sodium oleate when used in conjunction with alpha ethyl beta propyl acryl aniline in a pure gum stock. The following stocks were compounded and mixed:—

|  | A | B | C |
|---|---|---|---|
| Rubber | 100 | 100 | 100 |
| Zinc oxide | 2 | 2 | 2 |
| Sulphur | 3 | 3 | 3 |
| Alpha ethyl beta propyl acryl aniline | 0.5 | 0.5 | 0.5 |
| Sodium oleate | 0 | 0 | 0.75 |
| Oleic acid | 0 | 0.75 | 0 |

When cured at 60 lbs. steam pressure (307° F.) and tested for tensile strength the following results were recorded:

| Cure (Mins.) | Stock A | | Stock B | | Stock C | |
|---|---|---|---|---|---|---|
|  | Tensile strength Lbs. per Sq. in. | Elongation | Tensile strength Lbs. per Sq. in. | Elongation | Tensile strength Lbs. per Sq. in. | Elongation |
|  |  | Per cent |  | Per cent |  | Per cent |
| 5' x 60# | 2320 | 820 | 2580 | 770 | 2835 | 880 |
| 10' x 60# | 2730 | 790 | 3080 | 790 | 3410 | 770 |
| 15' x 60# | 3120 | 780 | 3090 | 760 | 3475 | 740 |
| 20' x 60# | 3250 | 760 | 3360 | 740 | 3395 | 730 |
| 25' x 60# | 3050 | 760 | 3210 | 740 | 3400 | 700 |

The above tests show that sodium oleate exerts a powerful effect on the curing characteristics of a stock accelerated by alpha ethyl beta propyl acryl aniline.

Example II

The following stock were compounded and mixed:

|  | A | B | C |
|---|---|---|---|
| Rubber | 100 | 100 | 100 |
| Zinc oxide | 2 | 2 | 2 |
| Sulphur | 3 | 3 | 3 |
| Alpha ethyl beta propyl acryl aniline | 0.5 | 0.3 | 0.25 |
| Sodium ethyl hexoate | 0 | 0.65 | 0 |
| Sodium stearate | 0 | 0 | 0.75 |

After curing at 60 lbs. steam pressure (307° F.) and tested for tensile strength, the following results were obtained:

| Cure | Stock A | | Stock B | | Stock C | |
|---|---|---|---|---|---|---|
|  | Tensile strength lbs. per sq. in. | Elongation | Tensile strength lbs. per sq. in. | Elongation | Tensile strength lbs. per sq. in. | Elongation |
|  |  | Per cent |  | Per cent |  | Per cent |
| 5' x 60# | 2060 | 920 | 2350 | 780 | 2760 | 800 |
| 10' x 60# | 2010 | 840 | 3110 | 730 | 3180 | 780 |
| 15' x 60# | 3120 | 770 | 3260 | 680 | 3310 | 740 |
| 20' x 60# | 3060 | 780 | 3120 | 670 | 3400 | 740 |
| 25' x 60# | 2990 | 770 | 3010 | 680 | 3140 | 740 |

The above results indicate the powerful effect the sodium salts exert on the curing characteristics of alpha ethyl beta propyl acryl aniline, resulting in considerable accelerator saving.

Example III

The following highly compounded stocks were mixed, calendered and cured:

|  | A | B |
|---|---|---|
| Rubber | 50 | 50 |
| Zinc oxide | 45.5 | 44.90 |
| Oil | 2 | 2 |
| Sulphur | 2 | 2 |
| Butylidene dimethyl paraphenylene diamine | 0.5 | 0.35 |
| Sodium alpha ethyl beta propyl acrylate | 0 | 0.75 |

On testing the cured slabs, the following results were obtained. The cures were carried out at 10 lbs. steam pressure (239° F.) and at 40 lbs. steam pressure (287° F.).

| Cure | Stock A | | Stock B | |
|---|---|---|---|---|
|  | Tensile strength lbs. per sq. in. | Elongation | Tensile strength lbs. per sq. in. | Elongation |
|  |  | Per cent |  | Per cent |
| 05' x 10# | 440 | 700 | 670 | 610 |
| 10' x 10# | 870 | 710 | 1145 | 630 |
| 15' x 10# | 1500 | 720 | 1510 | 650 |
| 20' x 10# | 1655 | 720 | 1790 | 690 |
| 30' x 10# | 2395 | 710 | 2560 | 700 |
| 40' x 10# | 2995 | 720 | 2875 | 710 |
| 80' x 10# | 3360 | 700 | 4270 | 710 |
| 60' x 10# | 3735 | 710 | 4050 | 700 |
| 5' x 40# | 3535 | 700 | 3870 | 740 |
| 10' x 40# | 4110 | 720 | 4135 | 700 |

| Cure | Stock A | | Stock B | |
|---|---|---|---|---|
| | Tensile strength lbs. per sq. in. | Elongation | Tensile strength lbs. per sq. in. | Elongation |
| | | Per cent | | Per cent |
| 15′ x 40# | 4240 | 690 | 4260 | 670 |
| 20′ x 40# | 4180 | 680 | 4050 | 620 |
| 25′ x 40# | 3965 | 660 | 3880 | 580 |

*Example IV*

In the following example the effect of sodium laurate and sodium oleate is illustrated, the sodium salts being precipitated in the accelerator prior to incorporation into the rubber stock.

"Accelerator A" was prepared by mixing 70 parts of alpha ethyl beta propyl acryl aniline with 30 parts of oleic acid and adding 4 parts of sodium hydroxide dissolved in 4 parts of water, during vigorous agitation. This results in the formation of approximately 32 parts of sodium oleate mixed with 70 parts alpha ethyl beta propyl acryl aniline.

"Accelerator B" was prepared by mixing 70 parts of alpha ethyl beta propyl acryl aniline with 30 parts of lauric acid and adding 5 parts of sodium hydroxide dissolved in 5 parts of water. The solution vigorously stirred. This results in the formation of approximately 33 parts of sodium laurate mixed with 70 parts alpha ethyl beta propyl acryl aniline.

The following stocks were compounded and mixed:—

| | A | B | C |
|---|---|---|---|
| Rubber | 50 | 50 | 50 |
| Zinc oxide | 43.5 | 43.5 | 43.5 |
| Magnesium oxide | 2 | 2 | 2 |
| Sulphur | 2 | 2 | 2 |
| Stearic acid | 2 | 2 | 2 |
| Alpha ethyl beta propyl acryl aniline | 0.5 | | |
| Accelerator A | | 0.5 | |
| Accelerator B | | | 0.5 |

After curing at 60 lbs. steam pressure (307° F.) the following tensile strength results were obtained:

| Cure (mins.) | Stock A | | Stock B | | Stock C | |
|---|---|---|---|---|---|---|
| | Tensile strength lbs. per sq. in. | Elongation | Tensile strength lbs. per sq. in. | Elongation | Tensile strength lbs. per sq. in. | Elongation |
| | | Per cent | | Per cent | | Per cent |
| 1′ x 60# | 605 | 720 | 1610 | 880 | 2085 | 840 |
| 2′ x 60# | 1535 | 770 | 3380 | 910 | 3720 | 880 |
| 3′ x 60# | 2510 | 800 | 3560 | 870 | 3780 | 820 |
| 5′ x 60# | 3630 | 810 | 3920 | 800 | 3680 | 720 |
| 7′ x 60# | 3690 | 780 | 3800 | 730 | 3500 | 720 |
| 10′ x 60# | 3530 | 730 | 3460 | 670 | 3090 | 680 |

The above examples serve to indicate how the invention may be utilized. Many modifications may be made without departing from the spirit of the invention.

In general, the quantity of sodium salt to be used in a rubber stock may vary from 0.25% to 3% although these limits are very flexible and the quantity to be used is dependent upon the result desired.

Some of the "activator" and accelerator combinations referred to above also possess the characteristic of causing more uniform vulcanization.

Having described my invention, what I claim is,

1. A rubber composition including an organic accelerator of vulcanization and an alkaline metal salt of an aliphatic monobasic acid having more than two carbon atoms in the chain.

2. A rubber composition including an organic accelerator of vulcanization of the aldehyde-amine type and an alkaline metal salt of an aliphatic monobasic acid having more than two carbon atoms in the chain.

3. A rubber composition including alpha ethyl beta propyl acryl aniline and an alkaline metal salt of an aliphatic monobasic acid having more than two carbon atoms in the chain.

4. A rubber composition including an organic accelerator of vulcanization and a sodium salt of an aliphatic monobasic acid having more than two carbon atoms in the chain.

5. A rubber composition including an organic accelerator of vulcanization of the aldehyde-amine type and a sodium salt of an aliphatic monobasic acid having more than two carbon atoms in the chain.

6. A rubber composition including alpha ethyl beta propyl acryl aniline and a sodium salt of an aliphatic monobasic acid having more than two carbon atoms in the chain.

7. As a step in preparation of a vulcanizable compound containing an organic accelerator consisting in incorporating an alkaline metal salt of an aliphatic monobasic acid having more than two carbon atoms in the chain.

8. A rubber composition including an organic accelerator of vulcanization and an alkaline metal salt of ethyl hexoic acid.

9. A rubber composition including an organic accelerator of vulcanization of the aldehyde-amine type and an alkaline metal salt of ethyl hexoic acid.

10. A rubber composition including an organic accelerator of vulcanization and sodium laurate.

11. A rubber composition including an organic accelerator of vulcanization of the aldehyde-amine type and sodium laurate.

12. As a step in the preparation of a vulcanizable compound containing an organic accelerator, consisting in incorporating into dry, raw rubber an alkaline metal salt of an aliphatic monobasic acid having more than two carbon atoms in the chain.

In testimony whereof, I affix my signature.

HAROLD A. MORTON.